(12) United States Patent
Kitamura et al.

(10) Patent No.: US 6,388,822 B1
(45) Date of Patent: May 14, 2002

(54) OPTICAL PICKUP DEVICE AND OPTICAL RECORDING MEDIUM

(75) Inventors: Kazuya Kitamura; Yukio Kurata, both of Tenri; Tetsuo Iwaki, Yamatokoriyama, all of (JP)

(73) Assignee: Sharp Kabushiki Kaisha, Osaka (JP)

( * ) Notice: Subject to any disclaimer, the term of this patent is extended or adjusted under 35 U.S.C. 154(b) by 109 days.

(21) Appl. No.: 09/597,652

(22) Filed: Jun. 19, 2000

(30) Foreign Application Priority Data

Jun. 22, 1999 (JP) .......................................... 11-174912

(51) Int. Cl.$^7$ ............................ G02B 9/04; G02B 3/10; G11B 7/00
(52) U.S. Cl. ...................... 359/793; 359/719; 359/721; 359/722; 359/724; 359/738; 359/369; 359/112.23
(58) Field of Search ................................. 359/719, 721, 359/722, 724, 738, 793; 369/112.01, 112.23–112.26

(56) References Cited

U.S. PATENT DOCUMENTS

| 4,256,374 A | * | 3/1981 | Mickleson | .................. | 359/779 |
| 6,049,430 A | * | 4/2000 | Heanue et al. | ............... | 359/642 |
| 6,055,113 A | * | 4/2000 | Yamamoto et al. | .......... | 359/661 |

FOREIGN PATENT DOCUMENTS

| EP | 0 840 156 A2 | * | 5/1998 |
| JP | 10-123410 | | 5/1998 |

OTHER PUBLICATIONS

Yamamoto et al, "0.8–Numerical–Apreture Two–Element Objective Lens for the Optical Disk," Japanese Journal of Applied Physics, vol. 36, Part 1, No. 1B (Jan. 1997).*
Narahara et al, "Optical Disc System for Digital Video Recording," Society of Photo–Optical Instrumentation Engineers, copyright 1999 (printed from the website of Philips Research).*
"Principles of Optics", Max Born and Emil Wolf, Third Edition 1965, pp.24–29.

* cited by examiner

Primary Examiner—Georgia Epps
Assistant Examiner—Evelyn A. Lester
(74) Attorney, Agent, or Firm—David G. Conlin; William J. Daley, Jr.; Dike, Bronstein, Roberts, and Cushman

(57) ABSTRACT

An optical pickup device which includes an objective lens having a numerical aperture of 0.7 or more collects light emitted from a light source and irradiates an optical recording medium. The objective lens and an antireflection film formed thereon are set so that the intensity of light incident on the outermost rim of the objective lens is 45% or more and 80% or less of the intensity of incident light from the light source to the center of the objective lens. According to the configuration, it is possible to provide an optical pickup device including a high NA objective lens which can suppress a reduction in the light amount at the lens rim.

15 Claims, 9 Drawing Sheets

OPTICAL PICKUP DEVICE AND OPTICAL RECORDING MEDIUM

BACKGROUND OF THE INVENTION

1. Field of the Invention

The present invention relates to an optical pickup device having an objective lens of a high NA for recording and reproducing information onto and from an optical recording medium, and an optical recording medium on which information is recorded by the device.

2. Description of the Background Art

Since light-employing techniques enable a large number of features such as high speed processing due to high frequencies, spatial information processing and phase processing, they are subject to research and development and put to practical use in wide-ranging areas including communication, measurement and processing.

For the techniques, high-precision objective lenses are used to reduce a light beam.

In recent years, expectations for image recording devices, particularly those employing light have been high, and techniques for mass storage capacity have become important. In addition to improving a recording medium, it is essential for mass storage of optical information recording to provide a smaller diameter of a beam spot, that is, to sufficiently narrow down a beam spot by using an objective lens.

As is well known, a beam spot diameter is proportional to a light wavelength and inversely proportional to an objective lens NA (Numerical Aperture). For the wavelength, blue laser diodes or blue or green SHG lasers have been developed in recent years. For the higher NA of an objective lens, higher density has been achieved such that the NA is 0.6 for DVDs (Digital Video Disks) as compared with 0.45 for CDs (Compact Disks). However, it has been difficult to attain much higher NAs with a single lens element with two aspheric surfaces. Therefore, an optical pickup device for attaining a higher NA by using a 2-group 2-element lens system is disclosed in Japanese Patent Laying-Open No. 10-123410.

FIG. 19 shows a 2-group 2-element objective lens 101 disclosed in Japanese Patent Laying-Open No. 10-123410. The objective lens has an NA of 0.85, and light which passes through objective lens 101 enters a transparent body 104 and forms a beam spot at an image point 105. Objective lens 101 is formed of a lens 102 on the light source side which has two aspheric surfaces and a second lens 103 on the disk side which is a plano-convex lens having a spherical shape for the convex surface.

Generally, in an objective lens of an optical pickup system, a laser light source has "Gaussian intensity distribution" in which the intensity is the highest around the center of the optical axis of the objective lens and becomes smaller toward the rim of the objective lens. For a high NA objective lens, the power of the entire objective lens needs to be increased, which leads to the need for increasing the curvature of each surface. Since the angle of incident light is large at the rim of each surface of the objective lens, the transmittance of light is small and thus the amount of light is substantially reduced.

FIG. 10 illustrates relations between the NA of an objective lens and the transmittance through the outermost rim of the light emitting surface of the objective lens in which the refractive index of a lens 100b is 1.5. The transmittance through the light emitting surface substantially decreases with the NA of 0.7 or more.

Therefore, the light amount at the lens rim is reduced by influences of both the light amount distribution of a laser light source and the transmittance. As a result, the beam spot which is narrowed down by the objective lens is not made smaller enough, and a small diameter sufficient for a high NA is difficult to attain.

SUMMARY OF THE INVENTION

An object of the present invention is to provide an optical pickup device which includes an objective lens of a high NA capable of suppressing a reduction in the light amount at the rim of the lens.

In one aspect, an optical pickup device of the present invention for attaining the above object collects light emitted from a light source by an objective lens having a numerical aperture (NA) of 0.7 or more and irradiates an optical recording medium so as to record or reproduce information onto and from the optical recording medium. Under the condition, the objective lens and an antireflection film formed thereon are set so that the intensity of light incident on the outermost rim of the objective lens is 45% or more and 80% or less of the intensity of light, from the light source, incident on the center of the objective lens.

In another aspect, the light pickup device of the present invention has the same condition to the one aspect. Under the condition, the objective lens and an antireflection film formed thereon are set so that the transmittance through the outermost rim of the objective lens is 90% or more of the transmittance through the center of the objective lens.

According to the structure in each of the above aspects of the present invention, it is possible to prevent a reduction in the light intensity at the outer periphery of a beam spot which is an important element in determining a beam spot diameter and to provide a beam spot diameter sufficiently smaller for a high NA. It is therefore possible to realize superior jitter characteristics and higher density optical recording.

In one embodiment of the optical pickup device in each of the above aspects, the objective lens includes a 2-group lens element formed of two lenses, at least one of the two lenses has a single-layer antireflection film formed on a surface on the light source side, and the maximum incident angle to the surface is or is below a value calculated by the following expression:

$$-4400 \times (NA)^3 + 9549 \times (NA)^2 - 6917 \times (NA) + 1730.$$

In another embodiment of the optical pickup device in each of the above aspects, the objective lens includes a 2-group lens element formed of two lenses, one of the two lenses that is on the light source side has a single-layer antireflection film formed on a surface on the optical recording medium side, and the maximum incident angle to the surface is or is below a value calculated by the following expression.

$$-1067 \times (NA)^3 + 2274 \times (NA)^2 - 1624 \times (NA) + 422$$

In still another embodiment of the optical pickup device in each of the above aspects, the objective lens includes a 2-group lens element formed of two lenses, at least one of the two lenses has a multi-layer antireflection film formed on a surface on the light source side, and the maximum incident angle to the surface is or is below a value calculated by the following expression:

$$-5707 \times (NA)^3 + 12867 \times (NA)^2 - 9685 \times (NA) + 2497.$$

In still another embodiment of the optical pickup device in each of the above aspects, the objective lens includes a 2-group lens element formed of two lenses, one of the two lenses that is on the light source side has a single-layer antireflection film formed on a surface on the optical recording medium side, and the maximum incident angle to the surface is or is below a value calculated by the following expression:

$$-600 \times (NA)^3 + 1294 \times (NA)^2 - 938 \times (NA) + 264.$$

In the optical pickup device in each of the above aspects, the light incident on the objective lens is preferably elliptically polarized light or circularly polarized light having an ellipticity of 0.4 or more.

In still another aspect, the optical pickup device of the present invention has the same condition to the one aspect. Under the condition, at least one lens surface of the objective lens has an antireflection film designed so that a portion providing the maximum light transmittance is other than the lens center of the objective lens.

Even by such a structure, it is possible to prevent a reduction in the light intensity at the outer periphery of a beam spot which is an important element in determining a beam spot diameter and to provide a beam spot sufficiently smaller for a high NA. It is therefore possible to realize superior jitter characteristics and higher density optical recording.

An optical recording medium of the present invention collects light by an objective lens having an NA of 0.7 or more so as to record and reproduce information. An antireflection film is formed on a surface on the light incidence side, and the antireflection film is set so that the light incident angle providing the maximum transmittance is an angle other than 90°.

According to the optical recording medium, the transmittance and the specific transmittance are increased as compared with a case where an antireflection film is not formed. Therefore, the transmittance at the maximum light incident angle can be set optimally.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

First Embodiment

An optical pickup device in a first embodiment of the present invention will be described first.

Figure 1:
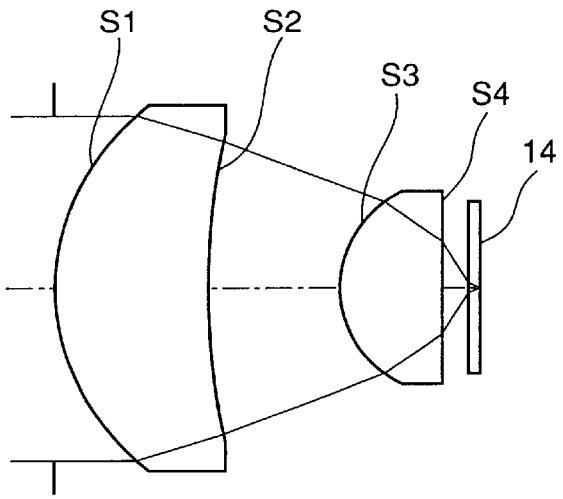
FIG. 1 shows, along with a light ray, a structure of an objective lens used for an optical pickup device in a first embodiment of the present invention.

In the optical pickup device of this embodiment, a 2-group objective lens (hereinafter, referred to as an objective lens) 1 is formed of two groups and two elements to realize a high NA, as shown in FIG. 1. In FIG. 1, the lens on the light source side is called a first lens 2, the lens on the side of an optical recording medium 14 is called a second lens 3, one surface of first lens 2 on the light source side is called a first surface S1, the other surface of first lens 2 is called a second surface S2, one surface of second lens 3 on the light source side is called a third surface S3, and the other surface of second lens 3 is called a fourth surface S4.

Figure 3:
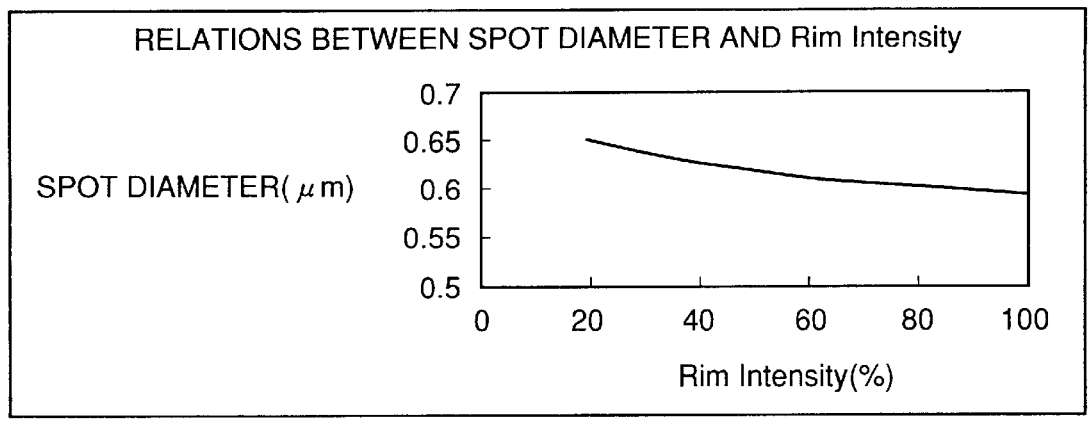
FIG. 3 illustrates relations between the incident light intensity (Rim Intensity) at the outermost rim relative to that at the center of an objective lens and the beam spot diameter ($1/e^2$, e is a base of natural logarithm) when the objective lens having an NA of 0.85 is employed.

FIG. 3 illustrates relations between the incident light intensity (Rim Intensity) at the outermost rim relative to that at the center of the objective lens and the beam spot diameter (diameter associated with a central intensity of $1/e^2$) when objective lens 1 having an NA of 0.85 is employed. It can be seen from the figure that the spot diameter increases as the Rim Intensity decreases. When the spot diameter increases, the recording density is lowered, the jitter characteristics are deteriorated, and cross talks are increased. If the increase in the beam spot area is within 10% as compared with a case when the Rim Intensity is 100%, it can be considered that the jitter characteristics are stable and the reduction in the recording density is acceptable. This corresponds to the increase of 5% or less of the beam spot diameter. Therefore, the Rim Intensity needs to be at least 45% or more in order to attain that beam spot diameter.

Figure 4:
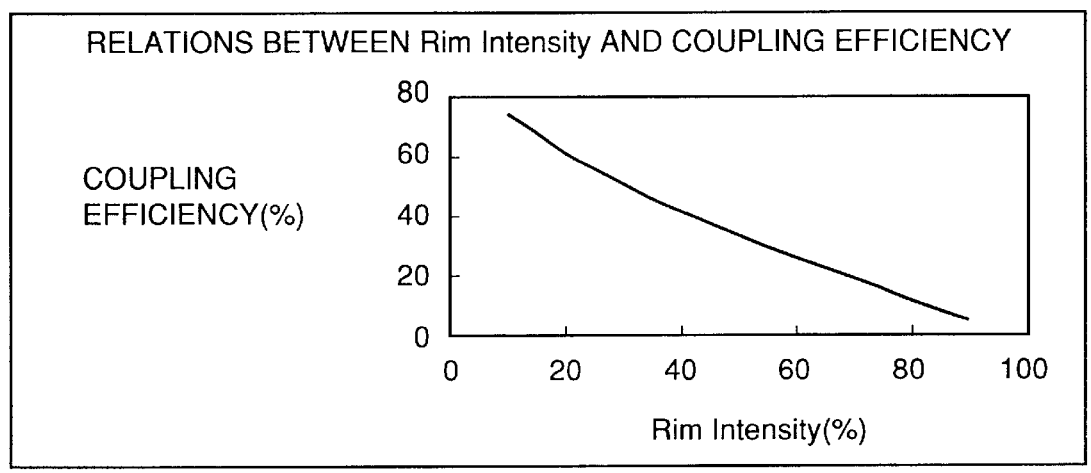
FIG. 4 illustrates relations between the Rim Intensity and the coupling efficiency.

Meanwhile, as is well known, the intensity distribution of a laser light source is Gaussian distribution, and the intensity is smaller at the rim than at the central portion of light incident on objective lens 1. Although a higher Rim Intensity is advantageous because it can reduce a beam spot, the efficiency of coupling with a laser beam (the utilization efficiency of a laser beam) is lowered as the Rim Intensity becomes larger. That results in a shortage of the power for reading and writing. FIG. 4 illustrates relations between the coupling efficiency with a laser beam and the Rim Intensity. Since the coupling efficiency of 10% or less does not provide the power necessary for writing and reading on and from an optical recording medium, it can be seen from FIG. 4 that the Rim Intensity needs to be 80% or less.

As described above, it is necessary that the Rim Intensity is 45% or more and 80% or less.

Furthermore, it is necessary to take into account a reduction in the light amount due to dependence of the transmittance through each surface of objective lens 1 on the incident light angle and to suppress the change amount of the beam spot diameter within 1%. The Rim Intensity which is necessary is found from the result of FIG. 3. When the ratio of the transmittance at the rim to the transmittance at the center (referred to as total specific transmittance) after transmission through the fourth surface of objective lens 1 is calculated, 90% or more is obtained.

Here, the description is based on the acceptable range of the Rim Intensity and the acceptable range of the ratio of the transmittance at the rim to the transmittance at the center after transmission through the fourth surface of objective lens 1 when the NA is 0.85. When the NA is 0.7 or more, these acceptable ranges do not exhibit substantial changes, and superior recording and reproducing operations can be realized if the Rim Intensity is 45% or more and 80% or less and the ratio of the transmittance at the rim to the transmittance at the center after transmission through the fourth surface of objective lens 1 is 90%.

In the following, the specific conditions of objective lens 1 which satisfy the above described conditions will be described.

Figure 5:
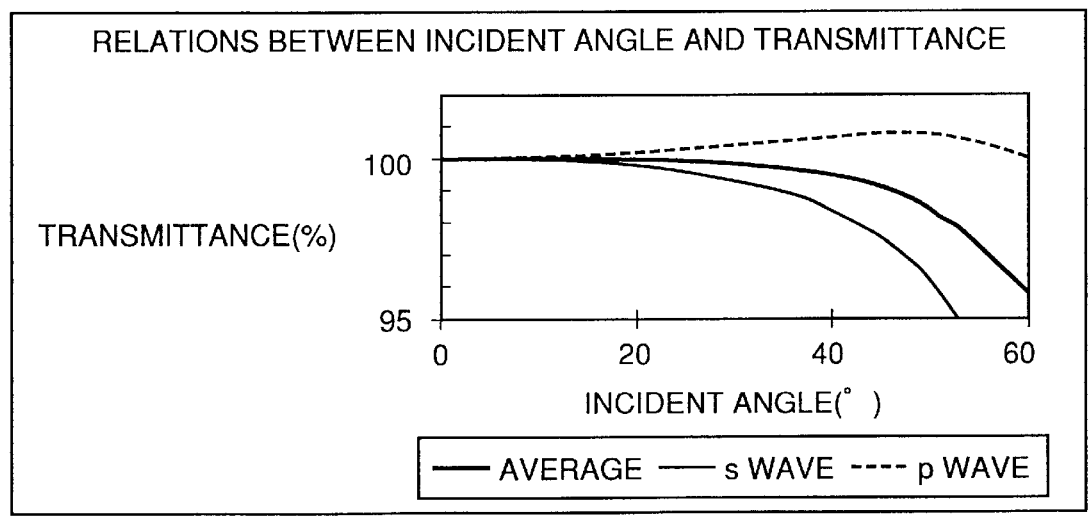
FIG. 5 illustrates relations between the incident light angle and the transmittance when a light ray enters from the air to the lens in the optical pickup device in the first embodiment of the present invention.
Figure 6:
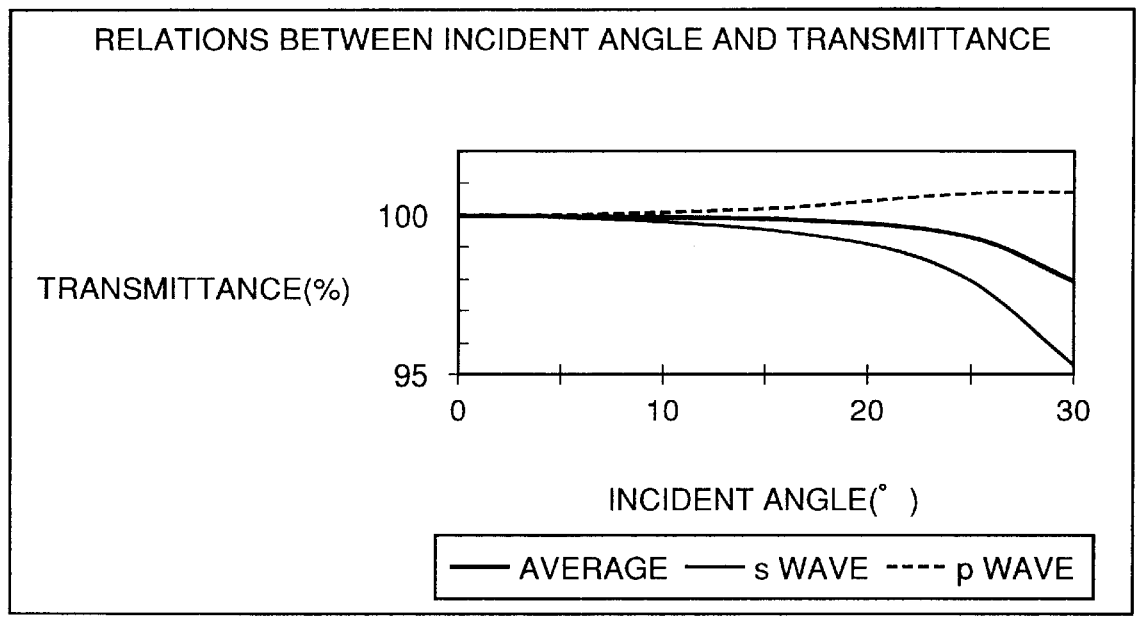
FIG. 6 illustrates relations between the incident light angle and the transmittance when a light ray exits from the lens to the air in the optical pickup device in the first embodiment of the present invention.

Assume that a single-layer film for antireflection is formed on objective lens 1. In order to increase the total specific transmittance, it is necessary to suppress a reduction in the transmittance at each lens rim caused by an increase in the incident light angle. FIG. 5 illustrates the transmittance, which assumes 100% when the incident light angle to the lens rim is 0°, for a surface in which a light ray enters from the air to the lens (in the case of a refractive index of 1.5). FIG. 6 illustrates the specific transmittance at the lens rim when a light ray exits from the lens (in the case of a refractive index of 1.5) to the air. In both of FIGS. 5 and 6, a single-layer film for antireflection is formed.

The incident light angle to fourth surface S4 of objective lens 1 is determined by the NA and the refractive index of the second lens. If the NA is 0.85 (assuming that the refractive index of the second lens is from 1.5 to 1.6), the incident light angle is from 32° to 34° and, when an antireflection single-layer film is formed, the specific transmittance is about 95%.

At this time, in order to attain 90% or more for the transmittance at the outermost rim relative to the center of the lens element having a total of four surfaces of two lenses, the specific transmittance needs to be made 98% or more for each surface of first, second and third surfaces S1, S2 and S3.

Consider the dependence on the incident angle when p and s waves are divided. For the surface in which a light ray enters from the air to the lens (FIG. 5), the incident angle of over 50° causes a transmittance difference of 5% or more between the p and s waves, and therefore the light amount distribution is made higher and the beam spot shape is affected if linearly polarized light is incident on the objective lens or if the ellipticity is small even for elliptically polarized light. Similarly, for the surface in which a light ray exits from the lens to the air (FIG. 6), the incident angle of over 30° causes a transmittance difference of 5% between the p and s waves. Herein, the ellipticity of elliptically polarized light is the square of the ratio of a shorter axis to a longer axis of an electric field vector (Max Born and Emil Wolf, "Principles of Optics", Third Edition, 1965, pp.25–28).

Figure 7:
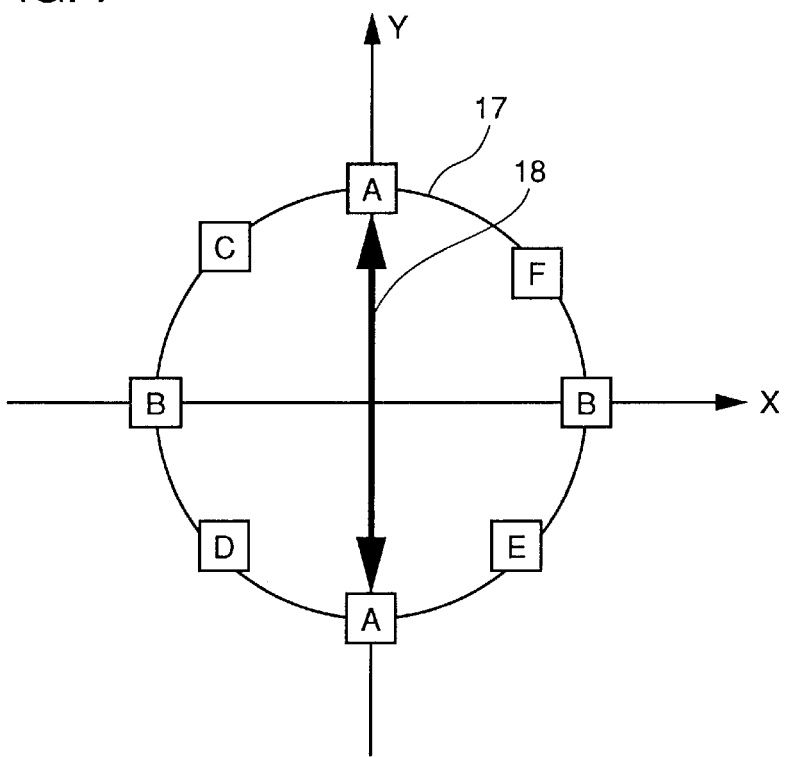
FIG. 7 is a view for illustrating an entrance pupil of the objective lens and the longer axis direction of elliptically polarized light.
Figure 8:
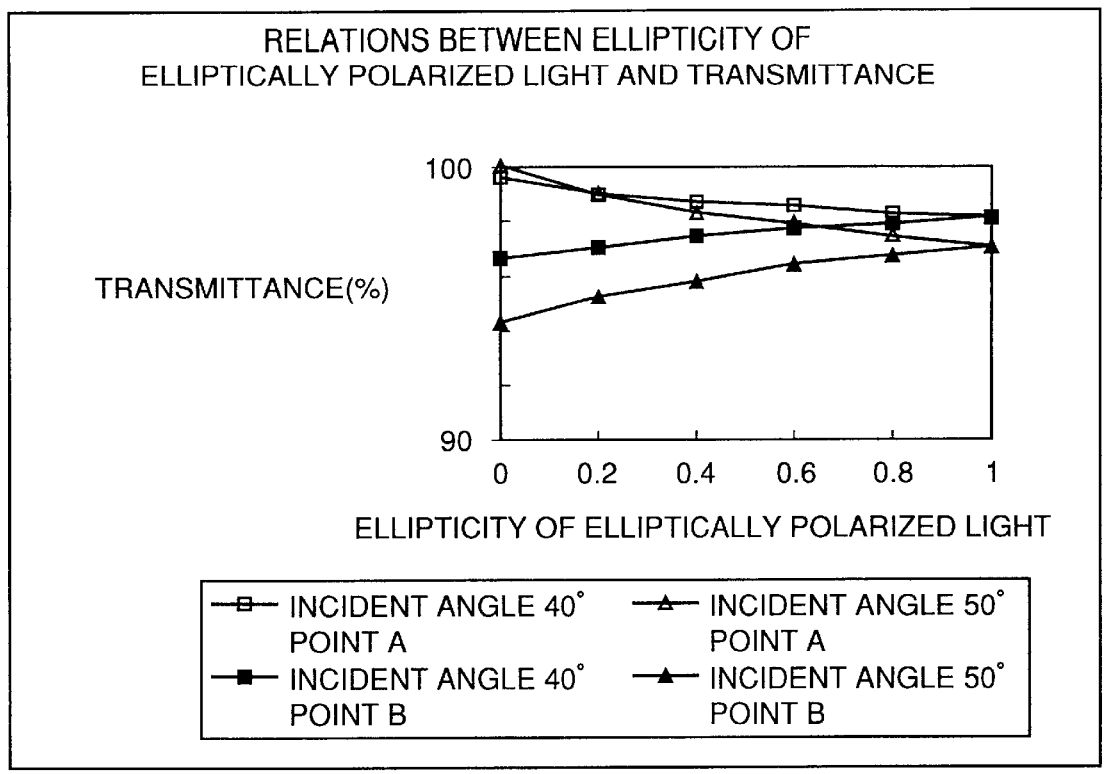
FIG. 8 illustrates relations between the ellipticity of elliptically polarized light and the transmittance.

FIG. 7 shows the entrance pupil 17 of an objective lens and the longer axis direction 18 of elliptically polarized light. In this case, relations between the transmittance and the ellipticity at points A and B in FIG. 7 for the incident angles of 40° and 50° are illustrated in FIG. 8. In order to ensure that the transmittance difference between points A and B is about 2% or less (that is, the transmittance at point B is 98% or more relative to that at point A), the ellipticity is desirably 0.4 or more for the incident angle of 50° and 0.2 or more for the incident angle of 40°.

Figure 9:
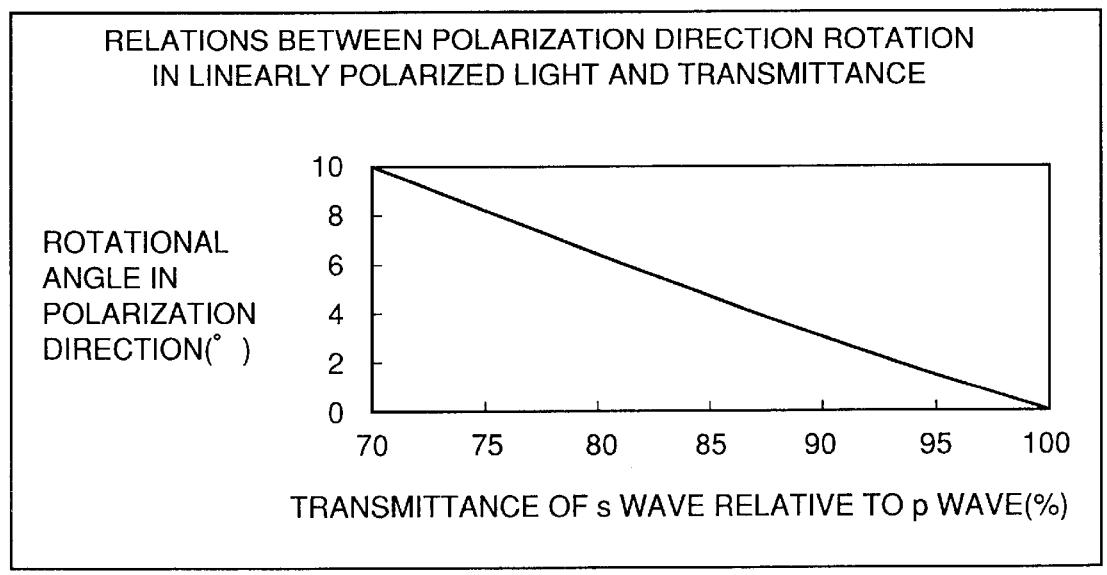
FIG. 9 illustrates relations between the rotational angle in the polarization direction and the transmittance of p and s waves.
Figure 10:
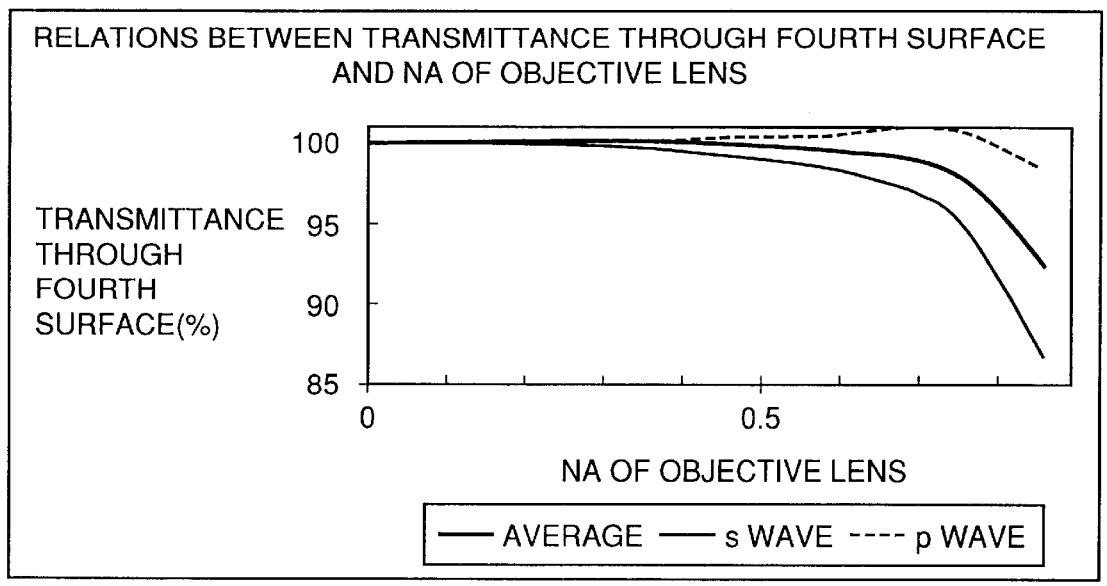
FIG. 10 illustrates relations between the NA of an objective lens and the transmittance through a fourth surface in the optical pickup device in the first embodiment of the present invention.

Since the independence of the transmittance on the incident angle is different for the p and s waves as illustrated in FIGS. 5 and 6, the polarization direction rotates counterclockwise at point C shown in FIG. 7. The polarization direction also rotates at points D, E and F for the same reason. However, the rotational direction is counterclockwise at point E and clockwise at points D and F. FIG. 9 illustrates relations between the rotational angle of polarized light at point C in linearly polarized light and the transmittance of the s wave relative to the p wave. Since the transmittance of the s wave relative to the p wave should be 95% or more in order to suppress the rotation of polarized light within 1 to 2° for each surface, it is found out from FIGS. 5 and 6 that the maximum incident angle needs to be 47.5° or less for the first and third surfaces and 29.3% or less for the second surface. Even if the incident light onto the objective lens is elliptically polarized light, the same tendency is observed, and the ellipse longer axis direction rotates in the same direction as the above case at points C, D, E and F.

From the above results, the maximum incident light angle to first, second and third surfaces S1, S2 and S3 need to be 47.5% or less, 29.3% or less, and 47.5% or less, respectively. Therefore, the specific transmittance can be made 90% or more for a combination of first and second lenses 2 and 3.

If the incident light angle to first surface S1 is made 20° or less, the refraction of first surface S1 is reduced and the refraction of second and third surfaces S2 and S3 has to be made larger. That causes the problems that the incident light angles to second and third surfaces S2 and S3 becomes larger and that aberration cannot be distributed properly, making the tolerance lower. The same applies to third surface S3.

Consequently, the incident light angle to first and third surfaces S1 and S3 are desirably 20° or more and 47.5° or less, and the incident light angle to second surface S2 is desirably 29.3% or less.

The specific conditions to be satisfied by lens 1 are determined as described above. Here, the specific conditions described are those when the NA is 0.85. However, the conditions can be obtained similarly even if the NA assumes a different value.

Figure 11:
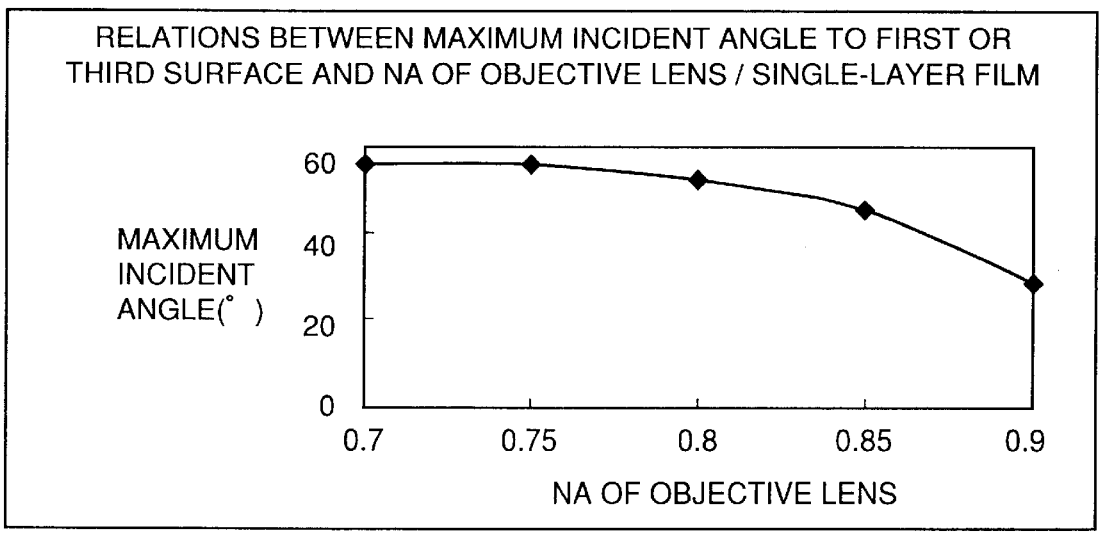
FIG. 11 illustrates relations between the limit value of the maximum incident angle to each of the first and third surfaces of the objective lens and its NA in the optical pickup device in the first embodiment of the present invention.
Figure 12:
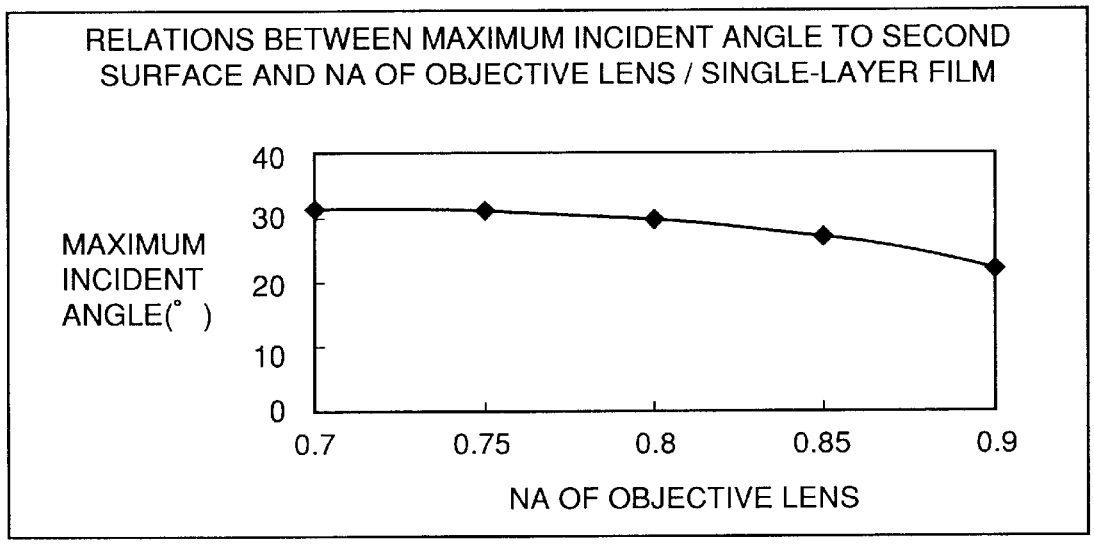
FIG. 12 illustrates relations between the limit value of the maximum incident angle to the second angle of the objective lens and its NA in the optical pickup device in the first embodiment of the present invention.

In FIGS. 11 and 12, the specific conditions to be satisfied by objective lens 1 as described above are found for various NAs and displayed in graphs. FIG. 11 illustrates the limit value of the maximum incident angle to each of first and third surfaces S1 and S3. FIG. 12 illustrates the maximum incident angle to second surface S2.

From these figures, the limit value of the maximum incident angle to each of first to third surface S1 to S3 is found as a function of an NA. For first and third surface S1 and S2, the following is obtained.

Maximum incident angle=$-4400 \times (NA)^3 + 9549 \times (NA)^2 - 6917 \times (NA) + 1730$ For second surface S2, the following is obtained.

Maximum incident angle=$-1067 \times (NA)^3 + 2274 \times (NA)^2 - 1624 \times (NA) + 422$ Therefore, such maximum incident angles that are lower than the above limit values have to be adopted for first, second and third surfaces S1, S2 and S3.

According to the configuration of objective lens 1 described above, the reduction in the light amount at the objective lens rim caused by the reduced transmittance due to a lens incident light angle can be made 10% or less.

In addition, by setting the Rim Intensity of light incident on objective lens 1 (first lens) to be 60% or more, the increase in the beam spot diameter can be made 2% or less of an ideal state. Thus, superior jitter characteristics and high recording density are attained.

Furthermore, by providing the polarized light of light incident on objective lens 1 in the form of elliptically polarized light or circularly polarized light having an ellipticity of 0.4 or more, the transmittance distribution at the lens rim and the rotation of incident polarized light can be made smaller.

Here, a magnesium fluoride film having a thickness of $\lambda/4n$ (n is a refractive index) is used as the antireflection single-layer film. When the antireflection single-layer film is used, substantial characteristics changes are not observed even for other materials, and therefore the values such as the maximum incident angle to each of the above described lenses can be applied in these cases.

Figure 2:
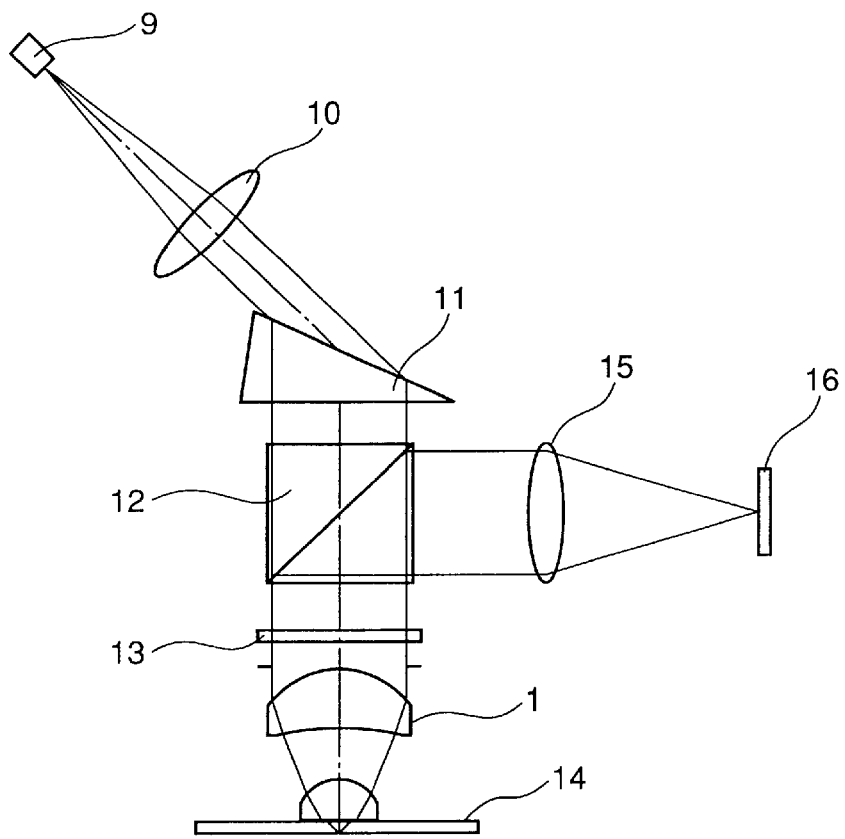
FIG. 2 shows a structure of the optical pickup device in the first embodiment of the present invention.

In the following, a specific structure of the optical pickup device in this embodiment will be described with reference to FIG. 2.

A laser beam having a wavelength of 635 nm which is emitted from an laser diode 9 as a light source is formed to a parallel light flux by a collimator lens 10, expanded and shaped in its light flux in the track width direction by a shaping prism 11, passed through a polarization beam splitter 12 and a ¼λ plate 13 before it is incident on first surface S1 of first lens 2 of objective lens 1. Here, the light incident on the objective lens is circularly polarized by ¼λ plate 13. The light flux which passes through objective lens 1 forms a beam spot on a signal recording plane of an optical recording medium 14. Light reflected on optical recording medium 14 traces back the above described route, reflects on polarization beam splitter 12, and detects an RF (Radio Frequency) signal, an RES (Radial Error Signal) and an FES (Focus Error Signal) at a light reception portion 16. Because of ¼λ plate 13, the light incident on the objective lens is circularly polarized. Here, 15 denotes a convex lens.

The configuration of objective lens 1 is as shown in Table 1 below.

TABLE 1

| surface number | curvature radius (mm) | surface interval (mm) | refractive index of glass | Abbe constant of glass |
|---|---|---|---|---|
| STO | INFINITY | 0 | | |
| S1 | 2.29957 | 1.8 | nd = 1.4955 | vd = 81.6 |
| | K: −0.546649 | | | |
| | A: 0.677362E-03 | B: −0.533334E-05 | | |
| | C: −0.531520E-04 | D: −0.431210E-05 | | |
| S2 | 9.13242 | 1.512127 | | |
| | K: −32.356495 | | | |
| | A: 0.250189E-02 | B: 0.276494E-03 | C: −0.448344E-04 | |
| | D: −0.127558E-03 | E: 0.328618E-06 | F: 0.243094E-04 | |
| | G: −0.451777E-05 | | | |
| S3 | 1.11556 | 1.2 | nd = 1.58913 | vd = 61.3 |
| | K: −0.317089 | | | |
| | A: −0.626846E-02 | B: 0.627622E-02 | C: 0.769126E-02 | |
| | D: −0.150332E-01 | | | |
| S4 | INFINITY | 0.3 | | |

TABLE 1-continued

| surface number | curvature radius (mm) | surface interval (mm) | refractive index of glass | Abbe constant of glass |
| --- | --- | --- | --- | --- |
| S5 | INFINITY | 0.1 | nd = 1.51680 | νd = 64.2 |
| IMAGE | INFINITY | | | | focal length: 2.349 mm
NA: 0.85

The NA is 0.85, first lens 2 has two aspheric surfaces, and second lens 3 is a plano-convex lens having an aspheric shape for its convex surface. For both first and second lenses 2 and 3, a single-layer film for antireflection of magnesium fluoride ($MgF_2$) is formed in a thickness of $0.25\lambda$. With the objective lens in this embodiment, the maximum incident angle is 45.5° for first surface S1, 7.5° for second surface S2, and 30.1° for third surface S3.

Here, the aspheric surface coefficients are represented by the following.

$$Z=(1/r)y^2/\{1+(1-(1+K)(1/r)^2y^2)^{1/2}\}+Ay^4+By^6+Cy^8+Dy^{10}+Ey^{12}+Fy^{14}+Gy^{16}$$

In the expression, Z is a distance of a point on the aspheric surface, which is at a height of y from the optical axis, from the aspheric surface apex, y is a height from the optical axis, r is a curvature radius at the aspheric surface apex, K is a conical constant, and A, B, C, D, E, F, G are aspheric surface coefficients. In the table, S5 denotes a cover glass provided on the surface of the optical recording medium, and IMG denotes an image plane.

According to such a configuration, the ratio of the transmittance at the rim to the transmittance at the center after transmission through the fourth surface of objective lens 1 was calculated to be 90% or more, and the increase in the beam spot diameter could be suppressed.

Second Embodiment

In the following, a second embodiment of the present invention will be described. An optical pickup and an objective lens in this embodiment are similar to those in the structure of the first embodiment except that a multi-layer film is formed as the antireflection film on the objective lens. The description is also based on FIGS. 1 and 2 above. Here, the same parts as the first embodiment will not be repeatedly described.

Similarly to the first embodiment, the Rim Intensity needs to be 45% or more and 80% or less, and the reduction in the light amount caused by the dependence of the transmittance at each objective lens surface on the incident light angle needs to be taken into account. In order to suppress the influence of the reduced light amount on the change in the beam spot diameter within 1% of the total change amount of the beam spot diameter, the ratio of the transmittance at the rim to the transmittance at the center after transmission through the fourth surface of objective lens 1 (total transmittance) has to be made 90% or more.

Figure 13:
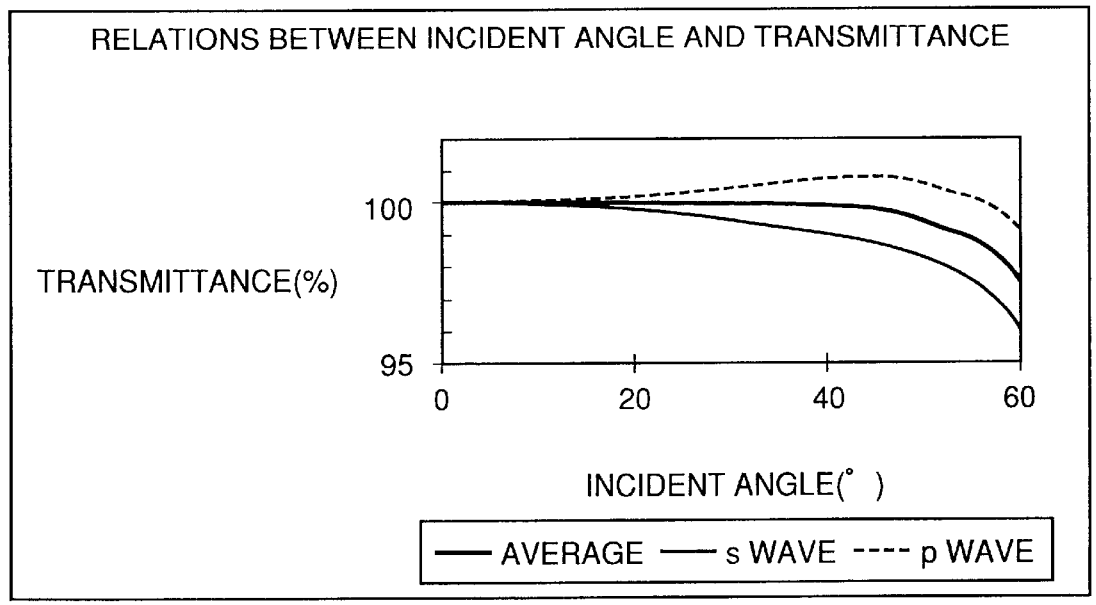
FIG. 13 illustrates relations between the incident light angle and the transmittance when a light ray enters from the air to the lens in the optical pickup device in the second embodiment of the present invention.
Figure 14:
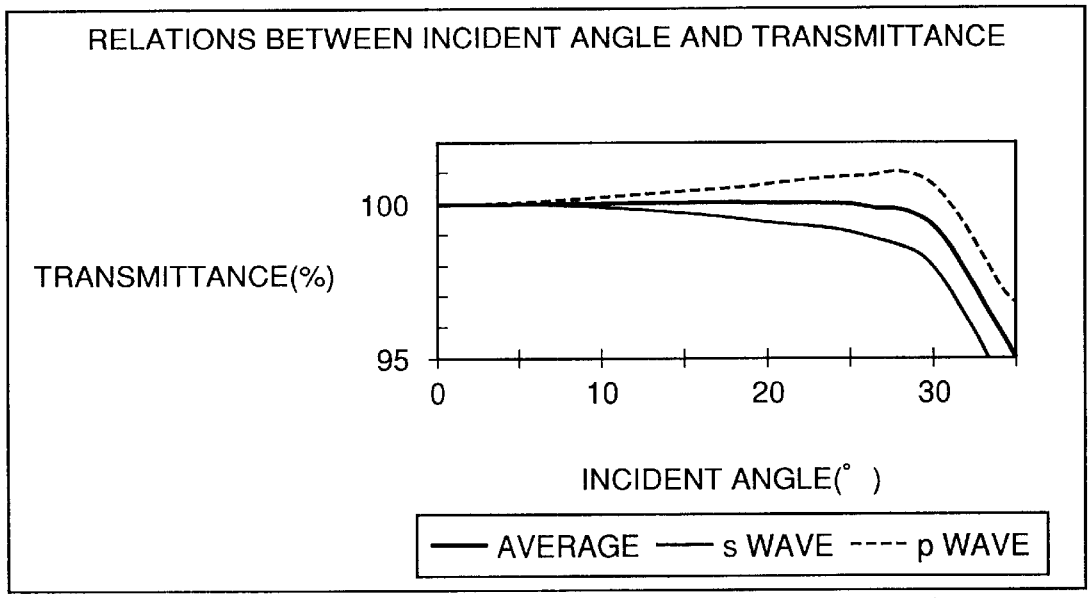
FIG. 14 illustrates relations between the incident light angle and the transmittance when a light ray exits from the lens to the air in the optical pickup device in the second embodiment of the present invention.

In this embodiment, a multi-layer film is formed for antireflection. FIG. 13 illustrates the dependence of the transmittance (specific transmittance), which assumes 100% when the incident light angle is 0°, on the incident angle (in a case where a light ray enters from the air to the lens). FIG. 14 illustrates the dependence of the specific transmittance on the incident light angle (in a case where a light ray exits from the lens to the air).

In order to ensure the total specific transmittance, the reduction in the specific transmittance caused by the increased incident light angle at the lens rim has to be suppressed. When the NA is 0.85, the incident light angle to fourth surface S4 of objective lens 1 is from 32° to 34° if the refractive index of second lens 3 is from 1.5 to 1.6. When the multi-layer antireflection film is formed, therefore, the specific transmittance is 96% from FIG. 14. Consequently, in order to provide 90% or more for the transmittance (specific transmittance) at the outermost rim relative to the center of a lens element having a total of four surfaces of two lenses, the specific transmittance needs to be 98% or more for first, second and third surfaces S1, S2 and S3.

In this case, it is therefore found out from FIGS. 13 and 14 that the specific transmittance can be made 90% or more for a combination of first and second lenses 2 and 3 by setting the maximum incident light angle to first surface S1, second surface S2 and third surface S3 to 56.3° or less, 33.1° or less, and 56.3° or less, respectively.

At this time, similarly to the first embodiment, if the above described angle ranges are given, the specific transmittance of the p and s waves are also 95% or more and the rotational angle in the polarization direction is also small.

If the incident light angle to first surface S1 is 20° or less, the refraction of first surface S1 is reduced and the refraction of second and third surfaces S2 and S3 has to be made larger. That causes the problems that the incident light angle to second and third surfaces S2 and S3 becomes larger and that aberration cannot be distributed properly, resulting in greater variation. The same applies to third surface S3.

Consequently, the incident light angle needs to be 20° or more and 56.3° or less for first and third surfaces S1 and S3, and 33.1° or less for second surface S2.

The specific conditions to be satisfied by objective lens 1 are determined as described above. Here, the specific conditions described are those when the NA is 0.85. However, the conditions can be obtained similarly even if the value of the NA is different.

Figure 15:
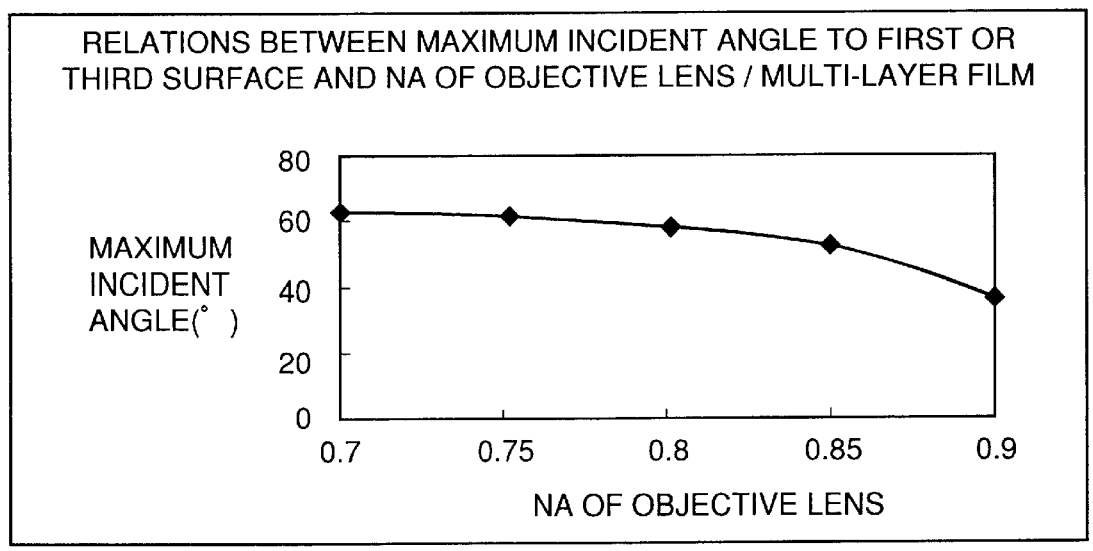
FIG. 15 illustrates relations between the limit value of the maximum incident angle to each of the first and third surfaces of the objective lens and its NA in the optical pickup device in the second embodiment of the present invention.
Figure 16:
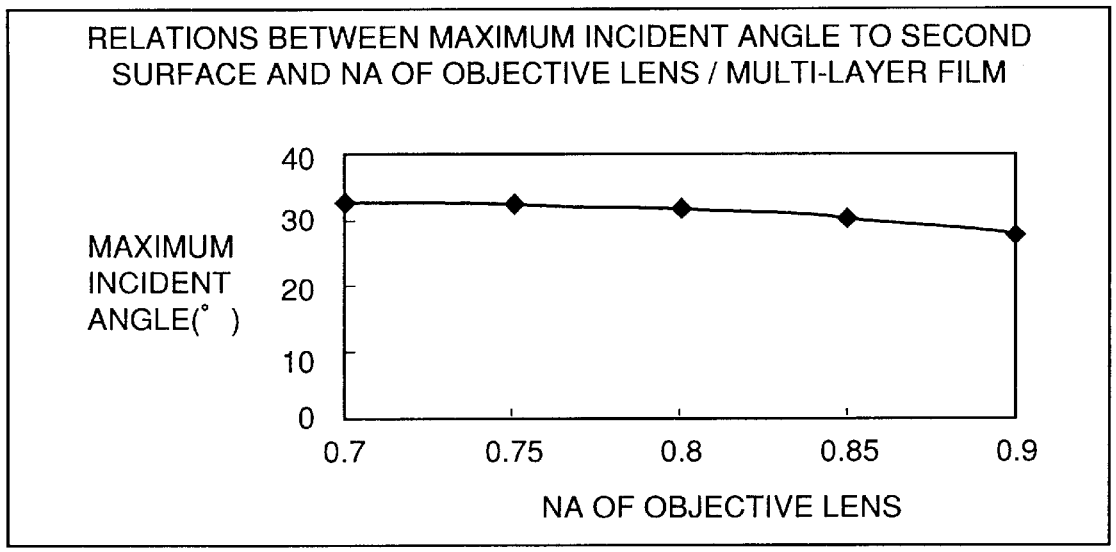
FIG. 16 illustrates relations between the limit value of the maximum incident angle to the second surface of the objective lens and its NA in the optical pickup device in the second embodiment of the present invention.

In FIGS. 15 and 16, the specific conditions to be satisfied by objective lens 1 as described above are found for various NAs and displayed in graphs. FIG. 15 illustrates the limit value of the maximum incident angle to each of first and third surfaces S1 and S3. FIG. 16 illustrates the maximum incident angle to second surface S2.

From these figures, the limit value of the maximum incident angle to each of first to third surface S1 to S3 is found as a function of an NA. For first and third surface S1 and S2, the following is obtained.

Maximum incident angle=$-5707\times(NA)^3+12867\times(NA)^2-9685\times(NA)+2497$ For second surface S2, the following is obtained.

Maximum incident angle=$-600\times(NA)^3+1294\times(NA)^2-938\times(NA)+264$

Therefore, such maximum incident angles that are lower than the above limit values have to be adopted for first, second and third surfaces S1, S2 and S3.

According to the specific configuration, the reduction in the light amount caused by the reduced transmittance due to a lens incident light angle can be made 10% or less.

In addition, by setting the Rim Intensity of light incident on objective lens 1 (first lens) to be 60% or more, the increase in the beam spot diameter can be made 2% or less of an ideal state. Thus, superior jitter characteristics and high recording density are attained.

A specific example will be described in the following. Here, the description is based on FIG. 1 in which the objective lens of this example is provided.

Table 2 shows a configuration example of objective lens 1. The NA is 0.85, first lens 2 has two aspheric surfaces, and second lens 3 is a plano-convex lens having an aspheric shape for its convex surface. Both first and second lenses 2 and 3 are provided with an antireflection multi-layer film of $MgF_2/ZrO_2/CeF_3$.

In the first and second embodiments, the description is based on a case where the objective lens is provided with an antireflection film (a single-layer film for the first embodiment and a multi-layer film for the second embodiment) which can best attain the antireflection effect at the lens center. In this embodiment, the antireflection film is different from the first and second embodiments, and the wavelength of the laser diode as a light source is 410 nm differently from the first and second embodiments. Even in this embodiment, with reference to FIGS. 1 and 2, description of the same parts as to the first and second embodiments will not be repeated.

Similarly to the first embodiment, the Rim Intensity needs to be 45% or more and 80% or less, and the reduction in the light amount caused by the dependence of the transmittance at each objective lens surface on the incident light angle needs to be taken into account. In order to suppress the influence of the reduced light amount on the change in the beam spot diameter within 1% of the total change amount of the beam spot diameter, the ratio of the transmittance at the

TABLE 2

| surface number | curvature radius (mm) | surface interval (mm) | refractive index of glass | Abbe constant of glass |
|---|---|---|---|---|
| STO | INFINITY | 0 | | |
| S1 | 2.63323 | 1.8 | nd = 1.4955 | νd = 81.6 |
| | K: −0.525430 | | | |
| | A: 0.140600E-02 | B: −0.138718E-04 | C: −0.419149E-04 | |
| | D: −0.235902E-04 | | | |
| S2 | 10.60521 | 1.717653 | | |
| | K: −16.373306 | | | |
| | A: 0.358574E-02 | B: 0.125841E-03 | C: −0.230712E-03 | |
| | D: −0.175007E-03 | E: −0.364570E-05 | F: 0.255399E-04 | |
| | G: −0.403278E-05 | | | |
| S3 | 1.0998 | 1.334942 | nd = 1.58913 | νd = 61.3 |
| | K: −0.340794 | | | |
| | A: 0.706495E-02 | B: 0.366307E-02 | C: 0.179981E-01 | |
| | D: −0.206091E-01 | | | |
| S4 | INFINITY | 0.3 | | |
| S5 | INFINITY | 0.1 | nd = 1.51680 | νd = 64.2 |
| IMG: | INFINITY | 0 | | | focal length: 2.349 mm
NA: 0.85

With objective lens 1 in this embodiment, the maximum incident angle is 37.6° for first surface S1, 8.9° for second surface S2, and 36.5° for third surface S3. Here, the aspheric surface coefficients are represented by the following.

$$Z=(1/r)y^2/\{1+(1-(1+K)(1/r)^2y^2)^{1/2}\}+Ay^4+By^6+Cy^8+Dy^{10}+Ey^{12}+Fy^{14}+Gy^{16}$$

In the expression, Z is a distance of a point on the aspheric surface, which is at a height of y from the optical axis, from the aspheric surface apex, y is a height from the optical axis, r is a curvature radius at the aspheric surface apex, K is a conical constant, and A, B, C, D, E, F, G are aspheric surface coefficients. In the table, S5 denotes a cover glass provided on the surface of the optical recording medium, and IMG denotes an image plane.

According to such a configuration, the ratio of the transmittance at the rim to the transmittance at the center after transmission through the fourth surface of objective lens 1 was calculated to be 90% or more, and the increase in the beam spot diameter could be suppressed.

Third Embodiment

In the following, a third embodiment of the present invention will be described.

rim to the transmittance at the center after transmission through the fourth surface of objective lens 1 (total transmittance) has to be made 90% or more.

In this embodiment, in order to realize the total specific transmittance as described above, the antireflection film provided on the lens is set so that a superior transmittance value is obtained not at the lens center but at the rim. In this case, a portion other than the lens center has the maximum specific transmittance.

By setting the filter in this manner, the total specific transmittance can be made larger and the increase in the laser spot diameter can be suppressed.

In the following, a specific example of an optical pickup device in this embodiment will be described.

The configuration of objective lens 30 is as shown in Table 3. The NA is 0.85, first lens 31 has two aspheric surfaces, and second lens 32 is a plano-convex lens having an aspheric shape for its convex surface. With the objective lens in this embodiment, the maximum incident light angle is 54.8° for first surface S1, 7.8° for second surface S2, and 34.0° for third surface S3. For both the first and second lenses, a single-layer antireflection film of magnesium fluoride ($MgF_2$) is formed. It is provided in a thickness of 0.293λ for the first lens so that the transmittance is the highest with the maximum incident light angle of 54.8° to first surface S1, and in a thickness of 0.2753λ for the second lens so that the transmittance is the highest with the maximum incident light angle of 34.2° to the third surface. Here, the aspheric surface coefficients are represented by the following.

$$Z=(1/r)y^2/\{1+(1-(1+K)(1/r)^2y^2)^{1/2}\}+Ay^4+By^6+Cy^8+Dy^{10}+Ey^6+Fy^8+Gy^{10}$$

In the expression, Z is a distance of a point on the aspheric surface, which is at a height of y from the optical axis, from the aspheric surface apex, y is a height from the optical axis, r is a curvature radius at the aspheric surface apex, K is a conical constant, and A, B, C, D, E, F, G are aspheric surface coefficients. In the table, S5 denotes a cover glass provided on the surface of the optical recording medium, and IMG denotes an image plane.

TABLE 3

| surface number | curvature radius (mm) | surface interval (mm) | refractive index of glass | Abbe constant of glass |
|---|---|---|---|---|
| STO | INFINITY | 0 | | |
| S1 | 2.24221 | 1.8 | nd = 1.4955 | vd = 81.6 |
| | K: −0.465644 | | | |
| | A: 0.287650E-02 | B: 0.350919E-03 | C: 0.486804E-04 | |
| | D: 0.828640E-05 | | | |
| S2 | 5.24146 | 1.567663 | | |
| | K: 0.623204 | | | |
| | A: 0.753828E-02 | B: 0.189304E-02 | C: 0.228896E-03 | |
| | D: −0.119924E-03 | E: −0.199600E-04 | F: 0.174190E-04 | |
| | G: −0.201103E-05 | | | |
| S3 | 1.08896 | 1.258199 | nd = 1.58913 | vd = 61.3 |
| | K: −0.336287 | | | |
| | A: 0.411775E-02 | B: 0.731488E-02 | C: 0.118539E-01 | |
| | D: −0.223074E-01 | | | |
| S4 | INFINITY | 0.3 | | |
| S5 | INFIMTY | 0.1 | nd = 1.51680 | vd = 64.2 |
| IMG: | INFINITY | 0 | | | focal length: 2.349 mm
NA: 0.85

Figure 17:
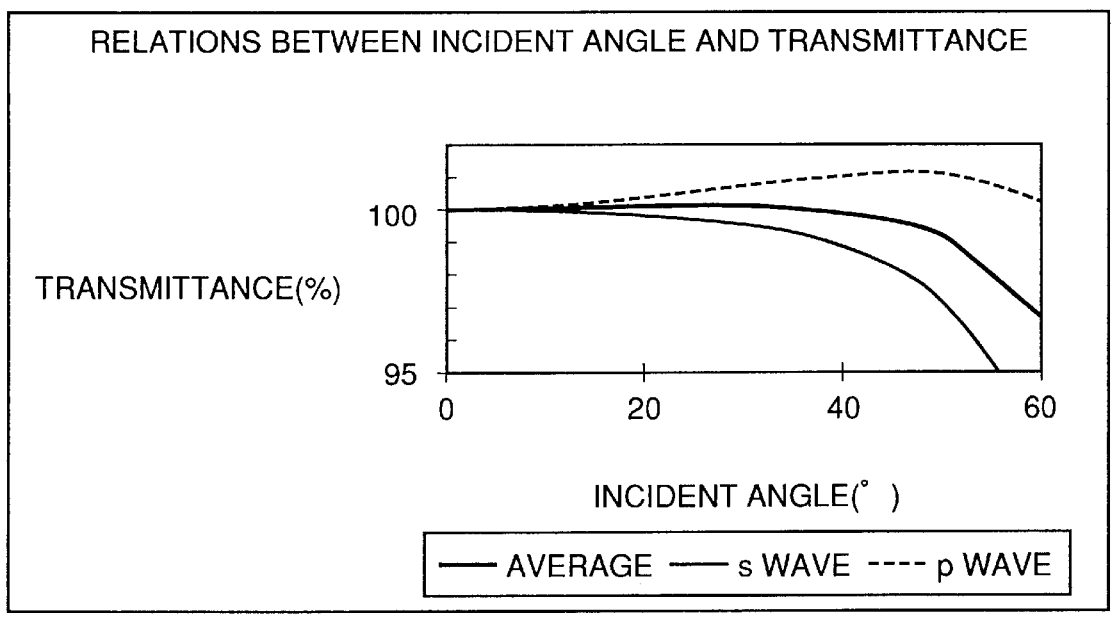
FIG. 17 illustrates relations between the incident light angle and the transmittance when a light ray enters from the air to a first lens in an optical pickup device in a third embodiment of the present invention.
Figure 18:
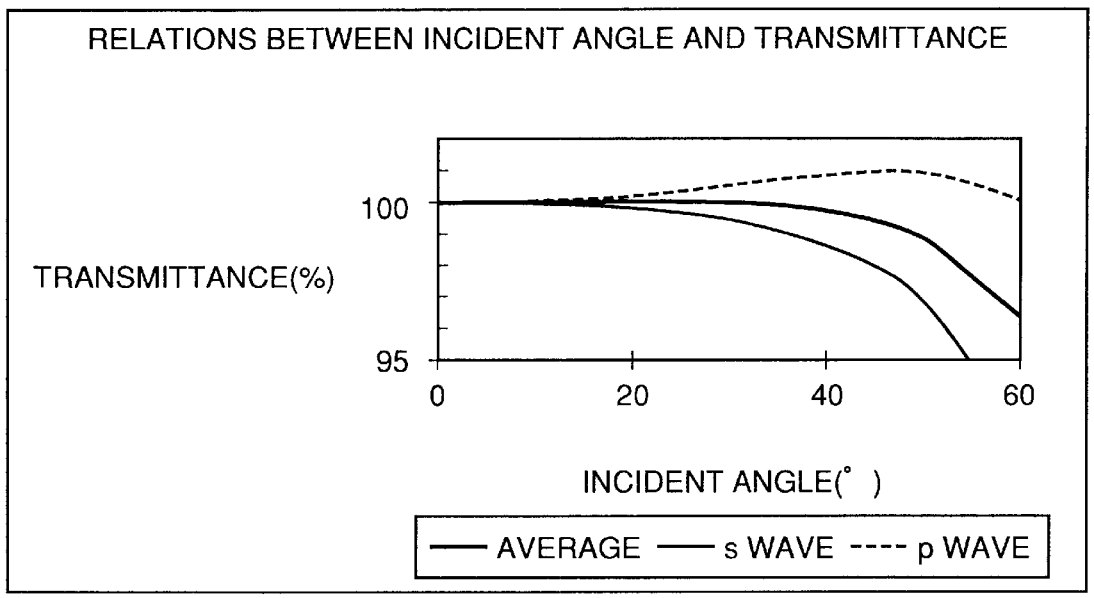
FIG. 18 illustrates relations between the incident light angle and the transmittance when a light ray enters from the air to a second surface in the optical pickup device in the third embodiment of the present invention.
Figure 19:
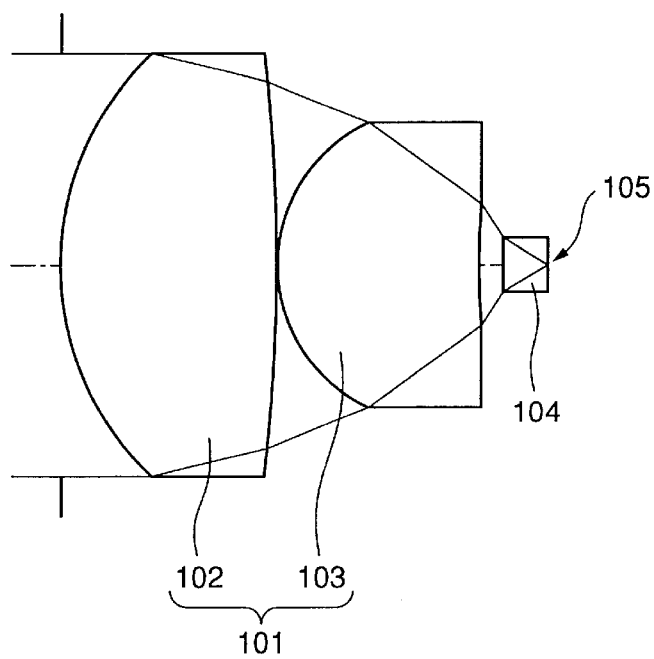
FIG. 19 shows a structure of a conventional 2-group 2-element objective lens.

FIG. 17 illustrates relations between the transmittance (specific transmittance), which assumes 100% when the incident light angle is 0°, and the incident light angle when a single-layer film is formed for antireflection as described above and a light ray enters from the air to first lens 2. FIG. 18 illustrates relations between the specific transmittance and the incident light angle when a light ray enters from the air to second lens 3. To ensure the total specific transmittance described above, it is necessary to suppress the reduction in the specific transmittance caused by the increased incident light angle at the lens rim.

When a single-layer antireflection film is formed, the incident light angle to the fourth surface of the objective lens is from 32° to 34° as determined from the NA of 0.85 (assuming that the refractive index of the second lens is from 1.5 to 1.6), and thus the specific transmittance is 95%. Therefore, in order to provide 90% or more for the transmittance (specific transmittance) at the outermost rim relative to the center of a lens element having a total of four surfaces of two lenses, the total specific transmittance of the first, second and third surfaces is 95% and the specific transmittance through each surface needs to be 98% or more.

For the objective lens in this embodiment which is provided with a single-layer antireflection film designed so that the transmittance is the highest for the maximum incident light angle to each surface, the specific transmittance through first surface S1 to fourth surface S4 and the total specific transmittance are shown in Table 4. The total value is 1.5% larger than when the film thickness is 0.25λ.

TABLE 4

| | transmittance (%) | |
|---|---|---|
| | Maximum incident angle optimization | 0° optimization |
| first surface | 98.4 | 97.5 |
| second surface | 100.0 | 100.0 |
| third surface | 100.0 | 99.8 |
| fourth surface | 97.4 | 96.9 |
| total | 95.9 | 94.3 |

From the above results, by setting the thickness of the antireflection films of first and second lenses 2 and 3 to 0.2933λ and 0.2753λ, respectively, so that the maximum transmittance can be obtained for the incident light angles of 55° and 34° that are the maximum incident light angles for first and third surfaces S1 and S3, the tolerance of the specific transmittance can be further increased. If the maximum incident light angle is 60° or less for first and third surfaces S1 and S3 and 40° or less for second surface S2, the Rim Intensity is ensured.

If the incident light angle to first surface S1 is made 20° or less, the refraction of first surface S1 is reduced and the refraction of second and third surfaces S2 and S3 has to be made larger. That causes the problems that the incident light angles to second and third surfaces S2 and S3 become larger and that aberration cannot be distributed properly, resulting in greater variation. The same applies to third surface S3.

Consequently, the incident light angle needs to be 20° or more and 60° or less for each of first and third surfaces S1 and S3 and 40° or less for the second surface.

Similarly to the first embodiment, if the above described angle ranges are given at this time, the transmittance of the p and s waves is also 95% or more and the rotational angle in the polarization direction is small.

In addition, since the maximum incident light angle for the NA of 0.85 is 58.2° even in an optical recording medium and thus the transmittance is reduced, an antireflection film in which the transmittance is set to be optimum at the maximum incident light angle can be provided on the optical recording medium in order to improve the transmittance at the angle. For example, assume that an antireflection film is provided so that the transmittance of incident light is the maximum at an angle other than normal to the surface of the optical recording medium. Specifically, if a single-layer film (MgF$_2$) optimized at the maximum incident light angle of 58.2° is formed, the transmittance is increased by 7.2% and the specific transmittance is increased by 2.3% for the incident light angle of 58.2° as compared with a case where there is not any antireflection film. The effect is also exhibited when a multi-layer film is formed.

In the above described embodiments of the present invention, if at least one surface of the multi-layer film included in the antireflection film of the optical recording medium is formed of a hard film during formation of the multi-layer film, the recording surface can be prevented from being damaged when it comes into contact with the objective lens. As the hard film, DLC (Diamond Like Carbon), SiN, CrO$_2$, Al$_2$O$_3$, SiO$_2$ or the like can be employed as an example.

According to the present invention related to the objective lens and the optical recording medium, it is possible to suppress the reduction in the light amount at the objective lens rim caused by the reduced transmittance due to a lens incident light angle and to suppress the increase in the beam spot diameter within 2% of an ideal state. Therefore, superior jitter characteristics and high recording density can be obtained.

In general, when the wavelength is lower than around 400 nm, the internal transmittance of a glass material is reduced. Although the central value of the wavelength in the above described embodiments is 410 nm, a glass material with a sufficiently large internal transmittance value is selected even if the wavelength is lowered by 10 nm. The material for the first lens described herein is FCD1 (HOYA) and the internal transmittance at 400 nm is 99.9%. The material for the second lens is M-BaCD5N (HOYA) and the internal transmittance at 400 nm is similarly 99.1%. When a light source near 400 nm is used in this manner, it is also necessary to take the glass material into account. As glass materials with a high transmittance value around 400 nm, it is preferable to employ crown glass such as BK (borosilicate crown), K (crown), BaK (barium crown), SK (heavy crown), LaK (lanthanum crown), and low dispersion glass such as FK (Schott) and FCD (HOYA). Conversely, the transmittance is lower for flint glass such as BaF (barium flint), LF (light flint), F (flint), BaSF, SF (heavy flint) and LaF (lanthanum flint). If these flint glass types are used, the transmittance is lowered by as much as 5% especially when the wavelength is lower.

Therefore, in the objective lens of the present invention, using the above described crown glass and low dispersion glass can attain higher transmittance, superior jitter characteristics and high recording density.

Further in the present invention, the effects are the same even if there is a change in the laser wavelength or the material for the antireflection film or the hard film. It is noted that the incident light angle herein is an angle formed between the light ray direction in each optical surface and the direction normal to the optical surface at a crossing between the light ray and the optical surface.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. An optical pickup device for collecting light emitted from a light source by an objective lens having a numerical aperture (NA) of 0.7 or more and irradiating an optical recording medium so as to record or reproduce information onto or from the optical recording medium, wherein said objective lens and an antireflection film formed thereon are set so that intensity of light incident on an outermost rim of said objective lens is 45% or more and 80% or less of intensity of light incident on a center of said objective lens from said light source.

2. The optical pickup device according to claim 1, wherein said objective lens includes a 2-group lens element formed of two lenses, at least one of said two lenses has a single-layer antireflection film formed on a surface on a side of the light source, and a maximum incident light angle to the surface is or is below a value calculated by $-4400 \times (NA)^3 + 9549 \times (NA)^2 - 6917 \times (NA) + 1730$.

3. The optical pickup device according to claim 1, wherein said objective lens includes a 2-group lens element formed of two lenses, one of said two lenses that is on a side of the light source has a single-layer antireflection film formed on a surface on a side of the optical recording medium, and a maximum incident light angle to the surface is or is below a value calculated by $-1067 \times (NA)^3 + 2274 \times (NA)^2 - 1624 \times (NA) + 422$.

4. The optical pickup device according to claim 1, wherein said objective lens includes a 2-group lens element formed of two lenses, at least one of said two lenses has a multi-layer antireflection film formed on a surface on a side of the light source, and a maximum incident light angle to the surface is or is below a value calculated by $-5707 \times (NA)^3 + 12867 \times (NA)^2 - 9685 \times (NA) + 2497$.

5. The optical pickup device according to claim 1, wherein said objective lens includes a 2-group lens element formed of two lenses, one of said two lenses that is on a side of the light source has a single-layer antireflection film formed on a surface on a side of the optical recording medium, and a maximum incident light angle to the surface is or is below a value calculated by $-600 \times (NA)^3 + 1294 \times (NA)^2 - 938 \times (NA) + 264$.

6. The optical pickup device according to claim 1, wherein light incident on said objective lens is elliptically polarized light or circularly polarized light having an ellipticity of 0.4 or more.

7. An optical pickup device for collecting light emitted from a light source by an objective lens having a numerical aperture (NA) of 0.7 or more and irradiating an optical recording medium so as to record or reproduce information onto or from the optical recording medium, wherein said objective lens and an antireflection film formed thereon are set so that a ratio of transmittance through an outermost rim of said objective lens to transmittance through a center of said objective lens is 90% or more.

8. The optical pickup device according to claim 7, wherein said objective lens includes a 2-group lens element formed of two lenses, least one of said two lenses has a single-layer antireflection film formed on a side of the light source, and a maximum incident light angle to the surface is or is below a value calculated by $-4400 \times (NA)^3 + 9549 \times (NA)^2 - 6917 \times (NA) + 1730$.

9. The optical pickup device according to claim 7, wherein said objective lens includes a 2-group lens element formed of two lenses, one of said two lenses that is on a side of the light source has a single-layer antireflection film formed on a surface on a side of the optical recording medium, and a maximum incident light angle to the surface is or is below a value calculated by $-1067 \times (NA)^3 + 2274 \times (NA)^2 - 1624 \times (NA) + 422$.

10. The optical pickup device according to claim 7, wherein said objective lens includes a 2-group lens element formed of two lenses, at least one of said two lenses has a multi-layer antireflection film formed on a surface on a side of the light source, and a maximum incident light angle to the surface is or is below a value calculated by $-5707 \times (NA)^3 + 12867 \times (NA)^2 - 9685 \times (NA) + 2497$.

11. The optical pickup device according to claim 7, wherein said objective lens includes a 2-group lens element formed of two lenses, one of said two lenses that is on a side of the light source has a single-layer antireflection film formed on a surface on a side of the optical recording medium, and a maximum incident light angle to the surface is or is below a value calculated by $-600 \times (NA)^3 + 1294 \times (NA)^2 - 938 \times (NA) + 264$.

12. The optical pickup device according to claim 7, wherein light incident on said objective lens is elliptically polarized light or circularly polarized light having an ellipticity of 0.4 or more.

13. An optical pickup device for collecting light emitted from a light source by an objective lens having a numerical aperture (NA) of 0.7 or more and irradiating an optical recording medium so as to record or reproduce information onto or from the optical recording medium, wherein at least one lens surface of said objective lens has an antireflection film which is set so that a portion having a maximum light transmittance is other than a center of said objective lens.

14. The optical pickup device according to claim 13, wherein light incident on said objective lens is elliptically polarized light or circularly polarized light having an ellipticity of 0.4 or more.

15. An optical recording medium for recording and reproducing information by using light collected by an objective lens having a numerical aperture NA of 0.7 or more, wherein an antireflection film is formed on a surface on a side of light incidence, and the antireflection film is set so that a light incident angle providing a maximum transmittance value is other than 90°.

* * * * *